Patented Jan. 13, 1942

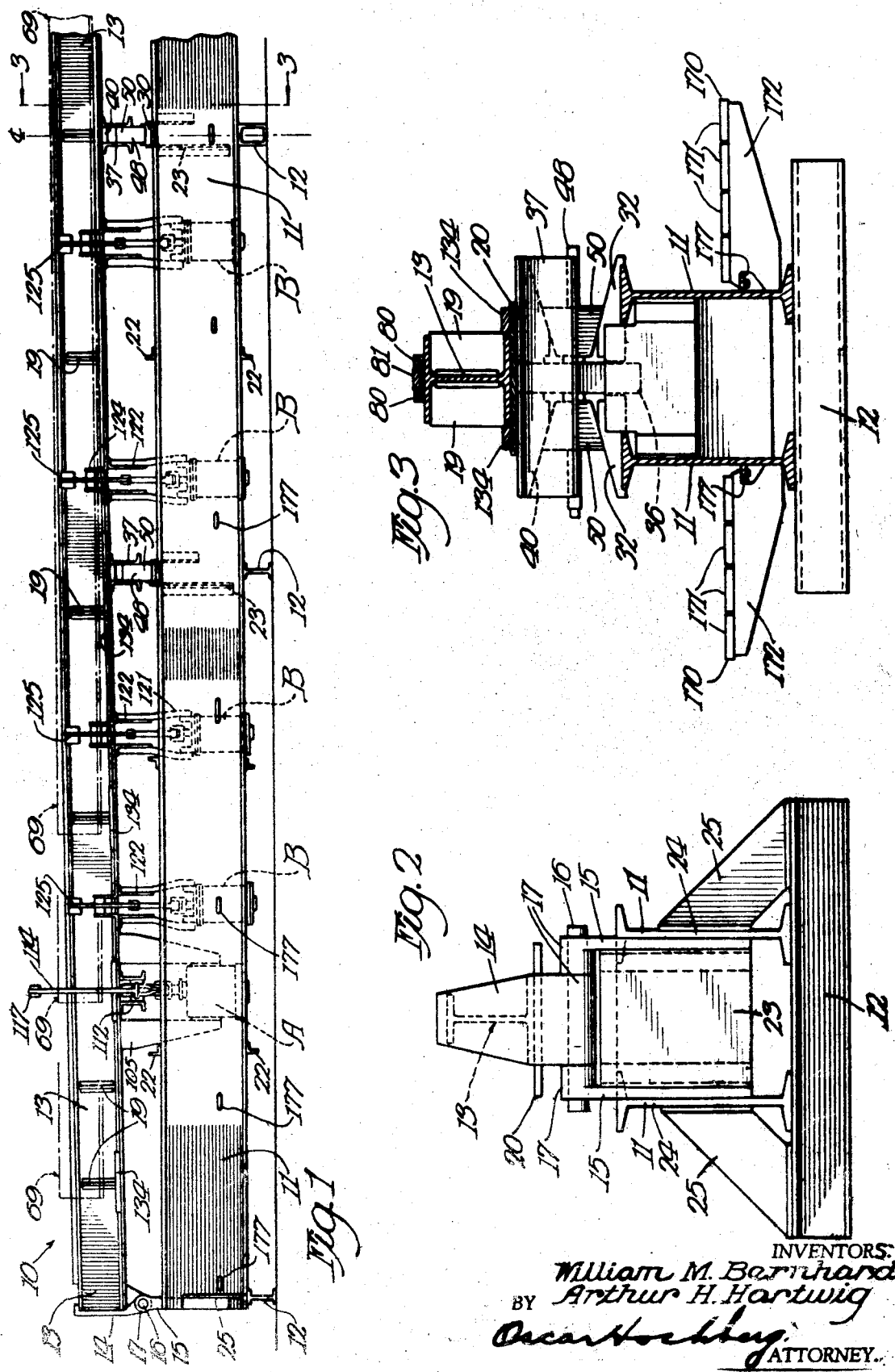

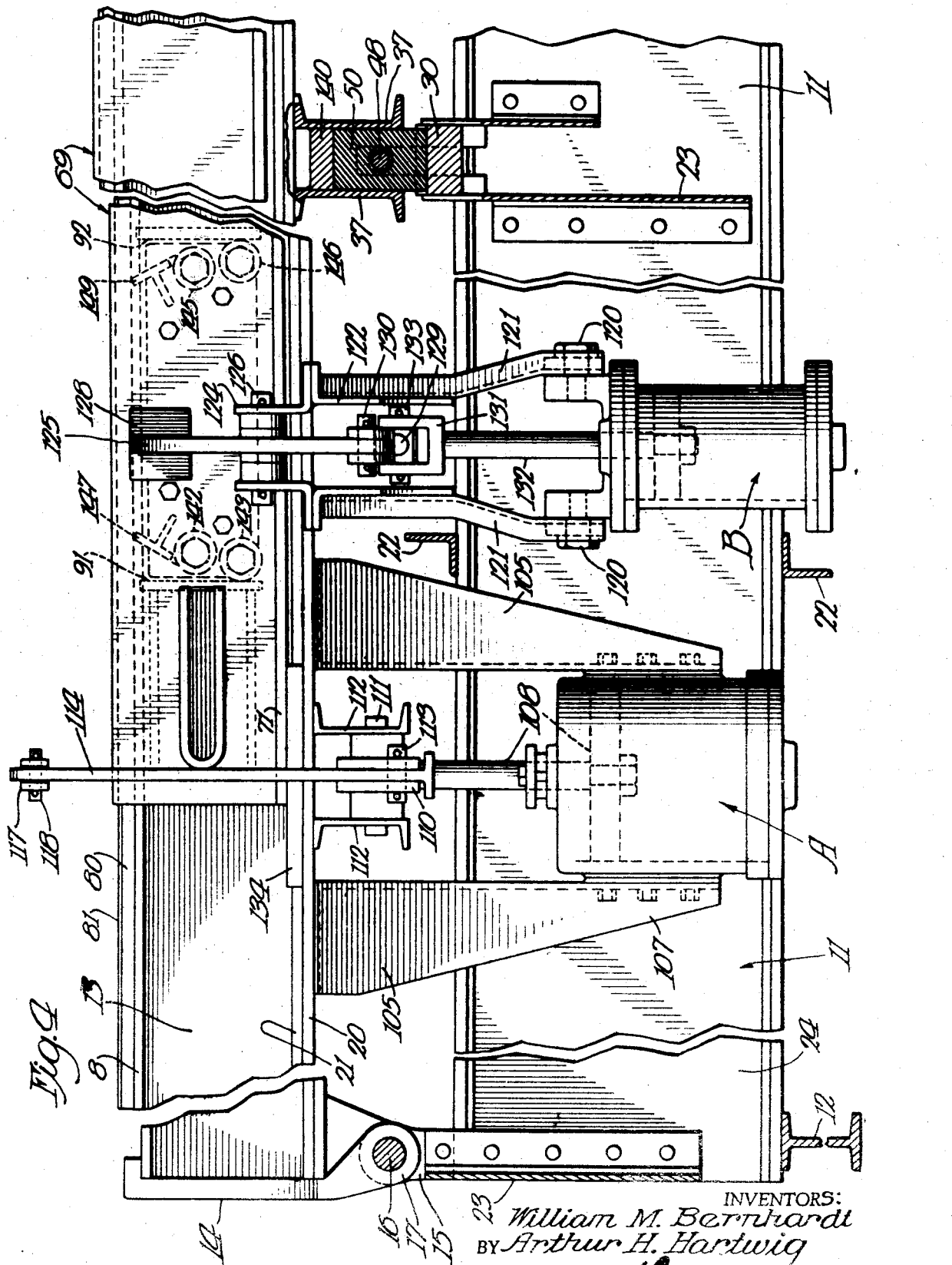

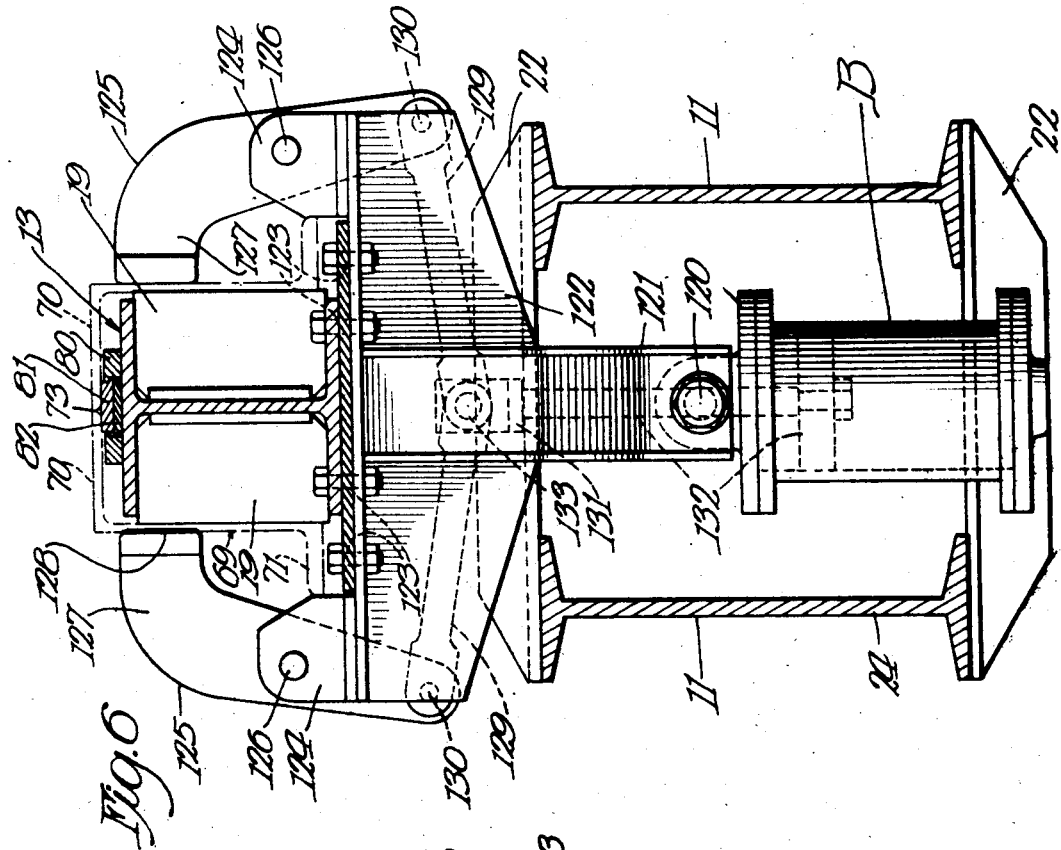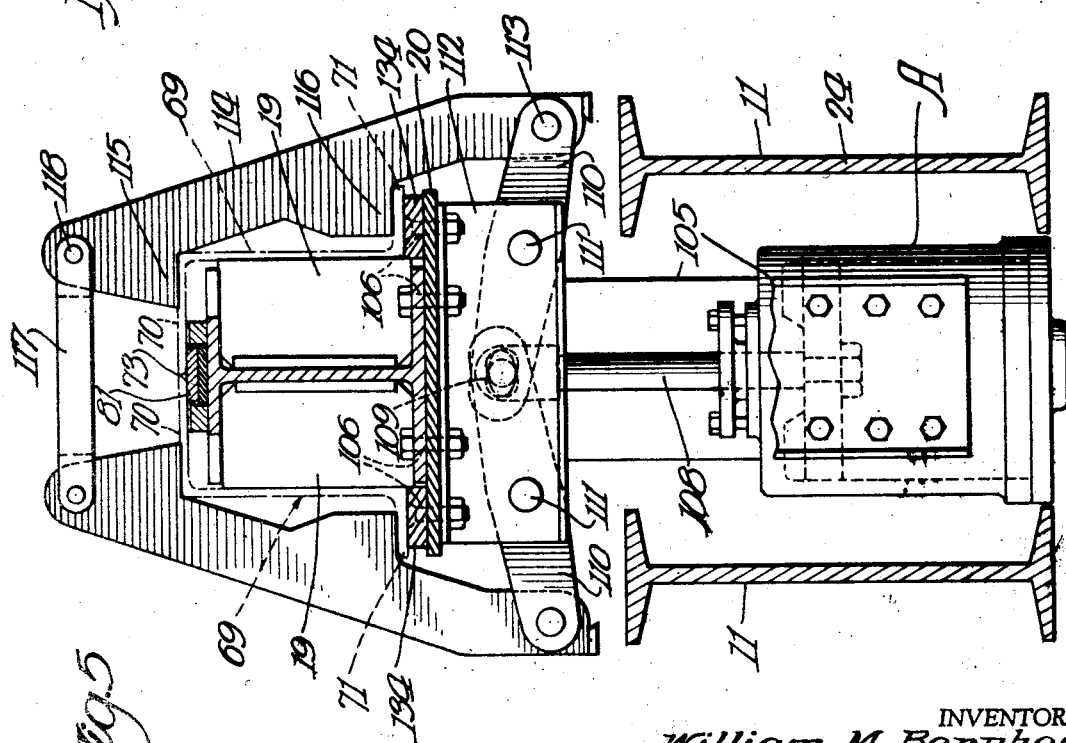

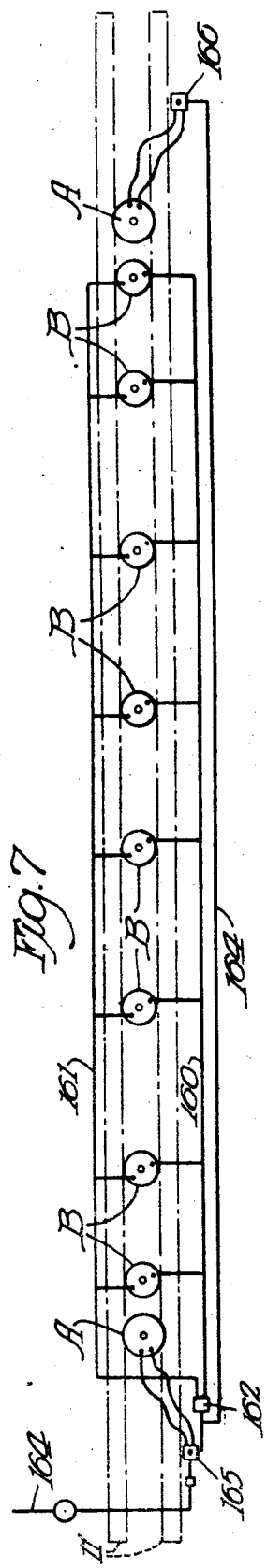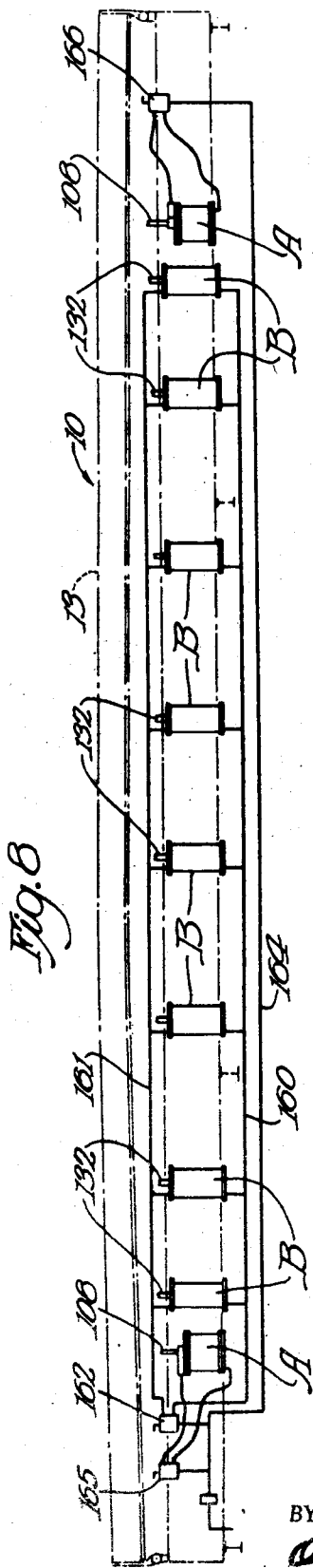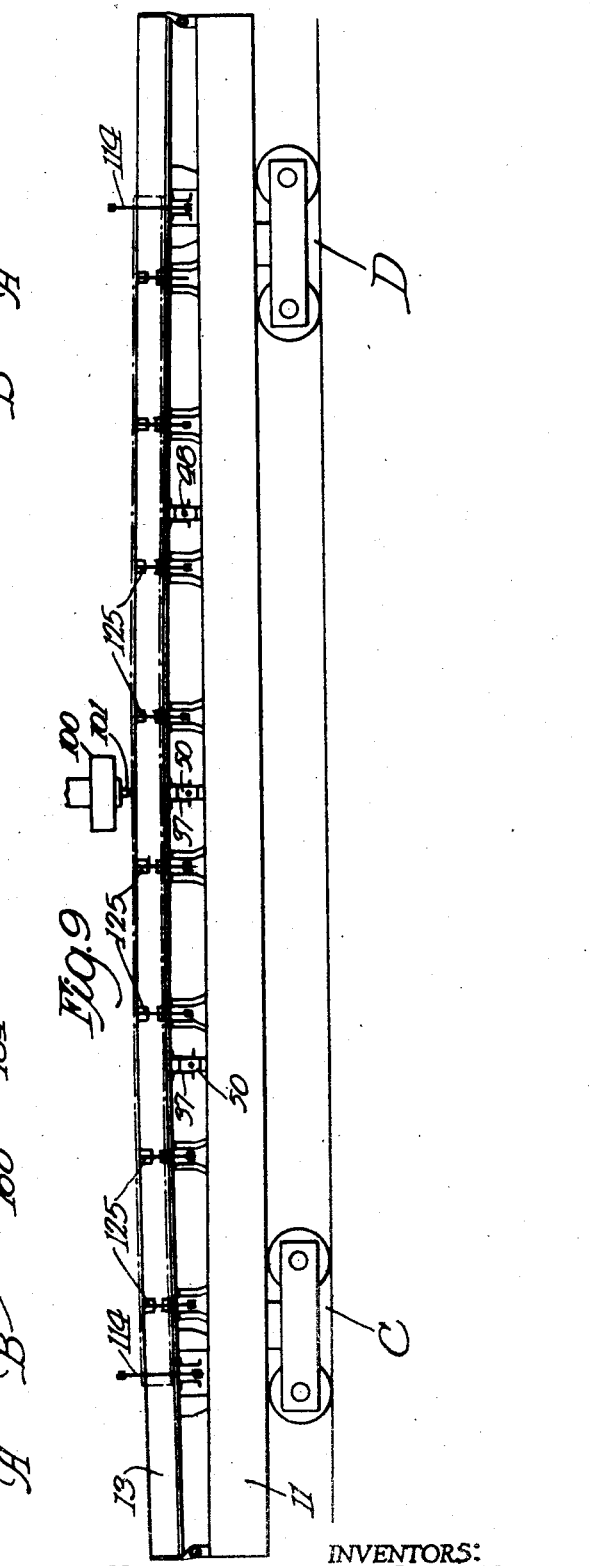

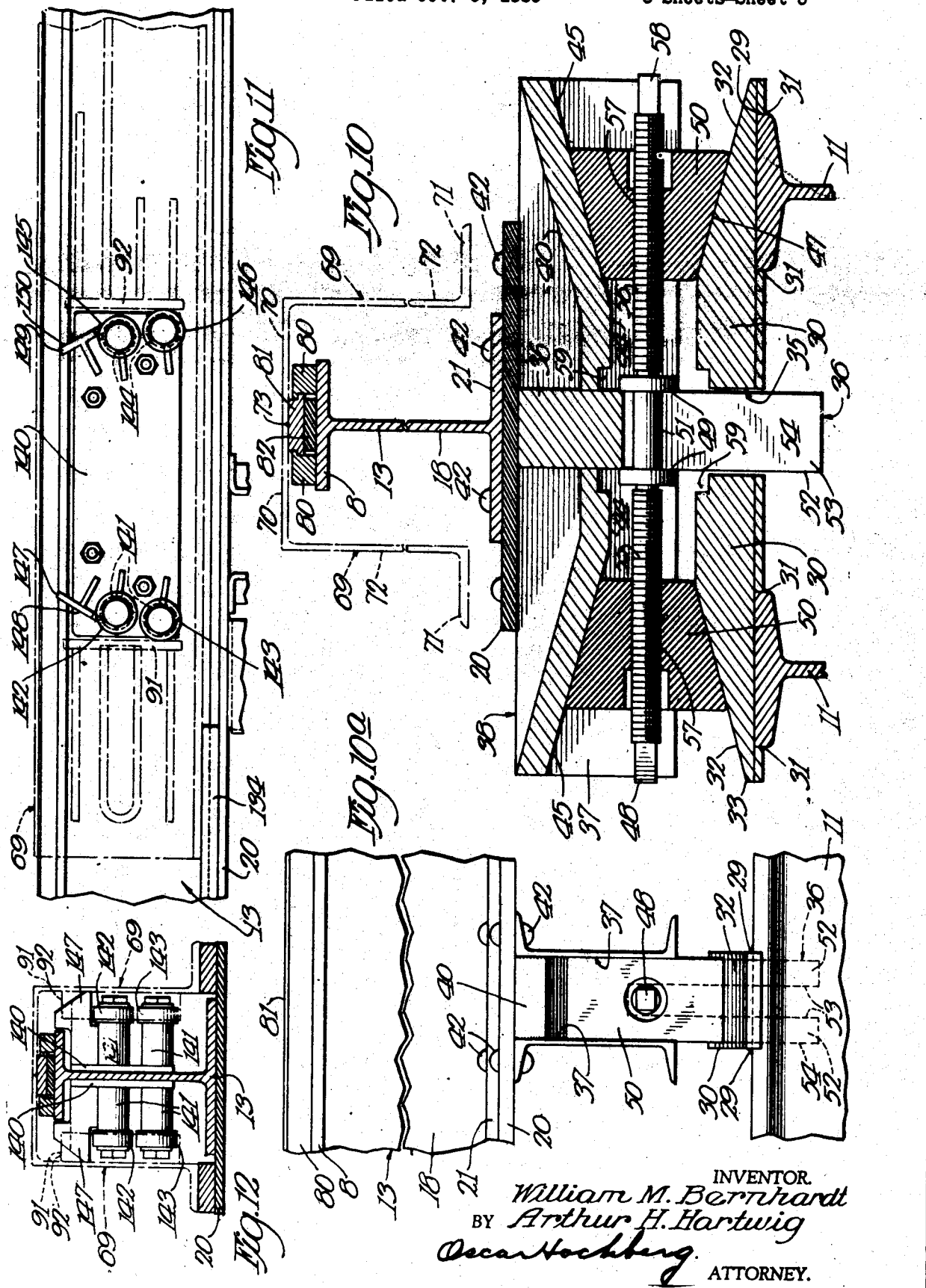

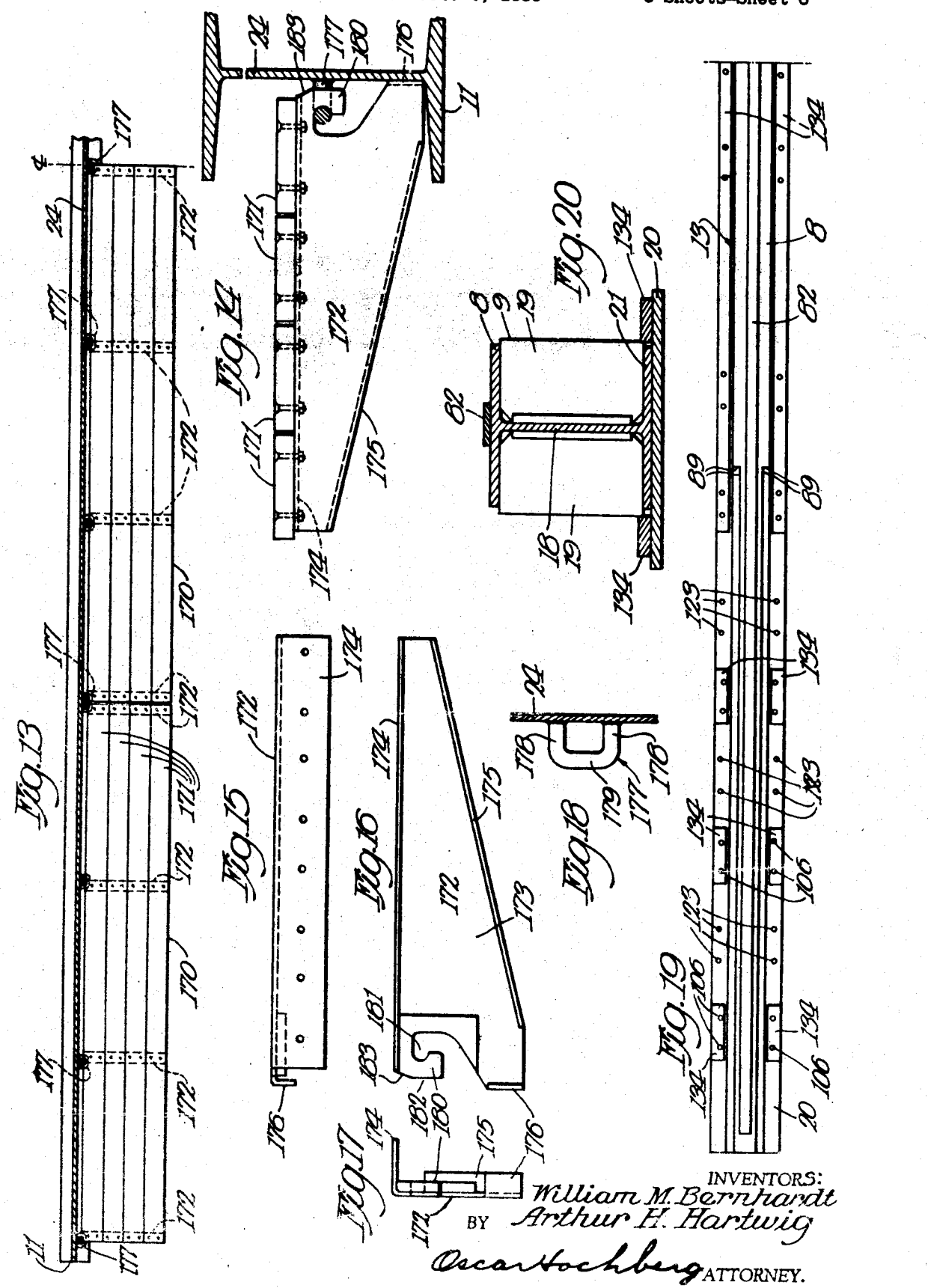

2,269,754

UNITED STATES PATENT OFFICE 2,269,754

SILL CAMBERING AND WELDING MECHANISM

William M. Bernhardt and Arthur H. Hartwig, Michigan City, Ind., assignors to Pullman-Standard Car Manufacturing Company, Chicago, Ill., a corporation of Delaware Application October 6, 1939, Serial No. 298,198

11 Claims. (Cl. 113—99)

The invention relates to means for constructing sills or beams to be fabricated of rolled metal sections united by welding and for cambering them to compensate for the shrinkage of the weld metal so that as the weld metal cools the sills will become straight or be held to a predetermined minimum of camber, as desired.

The principal object of the invention is to provide a portable machine adapted to be moved from place to place in a shop for operation at locations affording an air supply for clamping the work or at points providing available equipment for the welding operation.

A further object is to provide a mechanism fixed for use in welding operations where only a portable welding head is required, but adapted to be movably mounted for use with a fixed welding head where that type of installation is available.

Another object is to provide a machine having a relatively rigid base portion and an upper cambering beam portion—the pressure exerted by the cambering beam and the cambered work upon it being resisted by the base members.

A further object is to gauge and hold the work upon the cambering beam by means of clamps supported from the cambering beam independently of the base members, and separate controls for said positioning and securing clamps.

A further and important object is to provide a cambering machine having a rigid base member and a relatively flexible cambering member held down only at its ends by means of anchorage members yieldably secured to the base members to compensate for the movement of the cambering beam under thrust of intermediate flexing devices.

A still further object is to provide means associated with the work and machine for adjusting the work upon the cambering member of the machine independently of the work-holding mechanism.

The foregoing and other objects and advantages of the invention will appear from the following description taken in connection with the accompanying drawings, in which—

Fig. 1 is a side elevational view showing a preferred embodiment of the beam cambering and welding machine of the invention showing the method of anchoring the work-cambering beam of the machine to the relatively rigid base members through a pivot connection and the work positioned on said beam;

Fig. 2 is an end view of the same;

Fig. 3 is a vertical, sectional view of the structure taken on line 3—3 of Fig. 1 showing the method of connecting the spaced beams of the rigid base portion of the machine and mounting them upon the foundation pieces;

Fig. 4 is a view similar to Fig. 1 but showing, in larger detail, the application of the work end-clamping cylinders and mounting of the intermediate work side-clamping cylinders;

Fig. 5 is a detailed elevational view of the work end-clamping cylinder assembly;

Fig. 6 is a similar view of one of the intermediate work side-clamping cylinder assemblies;

Fig. 7 is a plan view of the air supply line system for controlling the end or side-clamping cylinders;

Fig. 8 is an elevational view of the same showing the disposition of the cylinder controls;

Fig. 9 is a view similar to Fig. 1 showing the cambering and welding machine mounted upon trucks for moving the work for welding with fixed welding heads;

Fig. 10 is a longitudinal, sectional view through one of beam cambering double-wedge assemblies arranged transversely of the machine and disposed between the base members and cambering beam of the machine for adjusting the beam to the camber desired;

Fig. 10ᵃ is an end view of the beam cambering double-wedge assembly;

Fig. 11 shows one side of one end of the cambering beam of the machine fitted with a work-positioning roller assembly designed to be received between the front and rear draft gear stops of a car sill member for adjustment of the work upon the cambering beam of the machine;

Fig. 12 is an end view of the work-positioning roller assembly shown in Fig. 11;

Fig. 13 is a plan view of a section of the removable catwalk arranged upon opposite sides of the machine, detachably secured to the machine base members in position shown in Fig. 14;

Fig. 14 shows an end view of the catwalk section supported at one side of one of the adjacent base beam members of the machine;

Figs. 15, 16 and 17 show, respectively, a top, side elevational and end view of the catwalk supporting brackets;

Fig. 18 is the hinge-eye for detachably securing the catwalk supporting-brackets to the base beam;

Fig. 19 is a plan view of the cambering beam showing the filler strip for supporting the copper welding bar shown in Fig. 10; and Fig. 20 is a vertical section through the cambering beam showing the relatively wide stiffening plate secured to the bottom chord flanges of the beam and the application of the web stiffener brackets and the bottom chord flange supporting blocks.

In said drawings, 10 represents the cambering and welding machine as a whole; 11 the base beams; 12 the foundation members; and 13 the superposed flexing or cambering beam. As best shown in Figs. 1 and 2, the cambering beam is pivotally secured at both its ends to respectively adjacent ends of base beams 11 by means of anchor pieces 14 and 15 secured, respectively, to cambering and base beams and connected by pins 16 removably entered in eyes 17 of the anchor pieces. To provide for variations in the length of the cambering beam 13, the eyes 17 of the anchor piece 15 on one end of the base beam are preferably elongated to allow for relative compensating movement of the cambering beam under flexing operations. As shown in Figs. 19 and 20, the flexing beam 13 is reinforced along its underside and for its full length by a relatively wide stiffening plate 20 secured to bottom chord flanges 21 of the flexing beam and adapted to be flexed with said beam under cambering operations. The web portion 18 of the beam is reinforced by stiffening brackets 19 secured, preferably by welding, to the web and at spaced intervals throughout the length of the beam to prevent possible buckling thereof under flexing. The outwardly extending portions 9 of the brackets are shaped for neat fit between the upper chord flanges 8 of the beam and bottom chord flanges 21 to prevent distortion and extend beyond the edges of the beam flanges for a purpose to be hereinafter described.

The base members 11 are secured to and mounted upon foundation pieces 12 arranged transversely thereof at intervals throughout the beam length and upon which the base members are held in spaced relation by connecting angle-ties 22 disposed at points along the beam length, top and bottom, between the foundation pieces. The base members, at their ends, are further secured together by spreader plates 23 held to the webs 24 of the beams 11 by riveting, or otherwise, and to the end foundation pieces 12 by diagonal brace plates 25 connecting said beam webs 24 and respectively adjacent ends of the foundation pieces. Thus connected and braced, the base beams 11 provide a rigid structure sufficient to prevent bending thereof under pull of the cambering beam 13 at the connecting anchor pieces 14 and 15 during thrust movement of beam cambering devices at points intermediate the beam ends, and the entire assembly may be moved as a unitary structure from one location in the shop to another.

For the purpose of flexing superposed beam 13 to produce therein a camber of the extent desired, double-acting wedge assemblies on the order of that shown in Figs. 10 and 10ᵃ are disposed between base beams 11 and cambering beam 13 at points preferably, as indicated in Fig. 1, at the center of the beam assembly and one each side of the center. The beams 11 at the wedge positions are fitted with wedge bottom slide portions 30 formed to rest upon the upper side of the base beams 11, the bottom faces being undercut, as at 31, to straddle the respective beams to which they are rigidly secured, preferably by welding, as at 29. The upper surfaces of these slides are inclined, as at 32, from the outer edges 33 at the outer sides of the beams upwardly at approximately 15° to a vertical plane adjacent the inner edges of the top flanges of the beams and horizontally thence, as at 34, to their inner ends 35. The slide portions 30 are supported upon the respective beams 11 with their inner ends 35 spaced apart to admit between them a yoke piece 36 secured between the side wall portions 37 of a top slide assembly 38 attached to the cambering beam 13. The top slide assembly complements the lower slide portions 30 through the medium of opposing top slide portions 40 secured between side wall channel pieces 41 rigidly secured to the underside of cambering beam 13 preferably by rivets 42 through flanges 43 of the wall members and bottom chord flanges 21 and stiffening plate 20, as best shown in Fig. 10ᵃ. The top slide portions 40, like the lower slides 30, are spaced apart transversely of the beam to receive between them the guide yoke 36 secured to wall members 37. The slide portions 40 are preferably welded along their side edges to the wall members 37, as at 39, Fig. 10ᵃ, and extend outwardly from the opposite sides of yoke piece 36 horizontally for a short distance, as at 44, thence upwardly, as at 45, to respectively opposite ends of the wall members 37 with a slope of approximately 15°. The opposing slide portions 32 and 45 together provide engaging faces for wedge nuts 50 having upper and lower slide-engaging faces 46 and 47 adapted to traverse respectively adjacent fixed slides under thrust of propelling screw rod 48 formed with a pair of retaining collars 49 spaced apart with a shaft portion 51 between them and designed respectively to engage the side edges 52 and inner faces 53 of side arms 54 of yoke 36. The rod 48, from collars 49 outwardly towards the respective rod end portions, is reversely threaded to provide right-hand threaded portion 55 and left-hand threaded portion 56 for engagement with internally tapped bores 57 in the respective wedge nuts 50. The ends of the shaft are polygonal in form, as at 58, to facilitate operation by means of a socket wrench or the like.

In operation, the shaft 48 is rotated in one direction to cause the nuts 50 to move inwardly upon inclined planes 32 and 45 to exert a thrust upwardly to cambering beam 13 through medium of side wall channel members 37 the upper flanges 43 of which bear against the underside of cambering beam stiffening plate 20 secured to lower chord flanges 21 of the beam to flex said beam to the extent of the camber desired. During this operation, the shaft will rise an amount determined by the travel of the nuts 50 upon the bottom slides 32—the intermediate shaft portion 51 moving in the space between guiding faces 53 of yoke arms 54, the retaining collars 49 of the shaft moving along adjacent side edges 52 against which they bear to resist longitudinal displacement of the shaft under load reactions of the cambered beam 13 upon the supporting nuts 50. To reduce the camber of beam 13 or restore the beam to its normal condition without camber, the shaft 48 is rotated in the opposite direction so that the cambering nuts 50 will move outwardly towards respective outer edges of inclined faces 32 and 45 to permit the whole upper wedge assembly 38 to drop an extent determined by amount of camber it is necessary to overcome in order to restore the beam to its normal, straight condition. It may be desirable to provide recesses 59 at the inner ends of slides 30 and 40 to receive the collars 49 when the beam 13 has been relieved of its camber upon retraction of nuts 50 outwardly of the assembly yoke 38 to insure full drop of the beam to normal.

Cambering beam 13 is also designed to permit welding of the parts making up the beams to be fabricated thereon—in this case, two Z-bar members 69 disposed with their upper flanges 70 directed towards each other and with their edges in position to be united by welding and with their lower flanges 71 directed outwardly, the web portions 72 extending vertically between them—all as clearly shown in Figs. 5 and 6. The welding of the sill members 69 is effected by arc welding machines—either portable or fixed—employing a welding head 100 of an approved type fitted with electrodes 101 which move, when an arc is struck, to liberate welding metal in the space along the line of juncture of the upper flanges 70 to provide a seam 73 rigidly uniting the members 69 to form a rigid beam structure of the type disclosed in Shaver Patent No. 2,122,159, of June 28, 1938. For this purpose, the cambering beam upper portion is fitted with retaining strips 80 of a ferrous metal removably secured to upper flanges 8 of the beam for holding a welding bar 81, of copper or other non-ferrous metal, between them for supporting the work during the welding operation, the use of the bar of non-ferrous metal being necessary to prevent adhesion of the supporting bar to the work. To avoid excessive use of copper in the conductor bar 81 for supporting the work, the bar is made shallow and a removable filler bar 82 is used to support the conductor bar; and, since the depth of the copper bar 81 is dependent upon the character of the work to be welded, the depth of the filler bar 82 would vary accordingly, and the bar is therefore not fastened to the beam 13 but merely held in position with the conductor bar by the retaining strips 80 to facilitate removal or application of either of said bars. The work to be welded—in the present embodiment a car sill—is placed upon the conductor bar 81, the top surface of which is arranged at a level slightly above that of the retaining strips 80 flanking the bar so that the upper flanges 70 of the Z-bar sill members 69 will rest upon the conductor bar only and with their undersides free of contact with the metal of the retaining strips.

Sill members 69, of the type indicated, are customarily fitted with front and rear draft stops 91 and 92 applied to the inner faces of members 69 adjacent the ends of the sill members as shown in Fig. 1. The sills 69 in this figure are represented as of three different lengths—all of them, of course, being of less length than the cambering beam 13 and are indicated to show the variations in position of the draft stops 91 and 92 within a given distance on the cambering beam 13 so that, within the range of positions of the stops on the longest and shortest sills of standard lengths apt to be welded on the machine, the upper flanges 8 of the beam 13 are cut away to a depth adjacent the welding bar retaining strips 80, as best shown in Fig. 5, and for a substantial distance along the beam from each end thereof, 17′ 4″ in the present embodiment, as shown in Fig. 19 at 89; and since the ends of the sills upon opposite sides of the center are identical, but one end thereof is indicated. The flanges 8 are thus cut away to permit passage of the draft stops 91 and 92 which normally project from the inner faces of the webs of the respective sill members 69 in order that the stops may be applied to the sills before they are brought for assembling on the cambering and welding machine. The sill members 69 having been mounted upon the beam 13, they are secured thereon against displacement during the cambering and welding operation by pressure devices hereinafter described.

The sill members 69 are held at their ends upon beam 13 by air clamps of the type shown in Fig. 5 which operate to hold down the sill ends and at points intermediate their ends by side-pressure clamps of the type shown in Fig. 6. The end clamps are operated by an air cylinder A secured against movement on supporting brackets 105 fixed to and depending from the underside of cambering beam 13 and disposed between base beam members 11 of the machine as indicated in Figs. 1 and 5. The cylinder supporting brackets 105 are removably secured to the underside of beam 13 by means of bolts through bolt openings 106 provided for them at various positions along the beam in the stiffening plate 20 and lower flanges 21 of the beam in order that the position of the end cylinders A may be shifted to a point determined by the length of the sills to be worked upon so that in all present standard lengths of sills 69 the clamping mechanism may be positioned at the ends of the sills. The cylinders A are also removably secured by bolts to depending portions 107 of brackets 105 to facilitate adjustment of cylinder and clamp position to the work.

The cylinders A are provided with pistons 108 having jaw portions providing a loose joint 109 for two clamp levers 110 supported at fulcrums 111 on spaced channel brackets 112 as shown in Fig. 5, the brackets being secured to underside of beam 13 at points between cylinder supporting brackets 105, as shown in Fig. 1. The clamp levers 110, at their respective outer ends, are pivotally connected at 113 to lower ends of adjacent sill hold-down clamping bars 114 formed at their upper ends with shoulder portions 115 arranged to overlie the upper flanges 70 of respectively adjacent sill members 69 and with intermediate portions, shaped to provide shoulder portions 116, disposed to overlie the outwardly extending lower flanges 71. The movement during operation of these clamping bars 114 is up and down under thrust of clamp-operating levers 110; therefore, to retain the clamping bars, with their hold-down shoulders 115 and 116, in position respectively to engage the upper and lower flanges of the sill members, the bars are held from outward movement by connecting members 117 removably attached to upper end portions of the bars by means of pins 118, or otherwise, during the cambering and welding operation and disconnected from one of the bars upon completion of the operation, allowing the bars to move outwardly from the work to permit removal of the completed sill from the machine.

To prevent distortion of the sill members 69 in the cambering operation under thrust of the end clamps 114 and to prevent separation of the joint between the top flanges 70 of the sill members during the welding period, the members are held from displacement laterally and the flanges retained in position for welding by means of side clamping assemblies of the type indicated in Fig. 6 and operating under pressure of air cylinders B supported between the base beams 11 and arranged at intervals along the machine. In the present embodiment, eight of these assemblies are used and may be shifted from one position to another along the length of the beam according to the length of the sill members to be operated upon. Since the only function of these assemblies is to prevent lateral displacement of the work at points intermediate the end hold-down clamp positions, the assembly operating air cylinders B may be smaller than the cylinders A operating the end clamps performing the relatively heavy task of cambering the sill members and thus holding them during the welding operation. The cylinders B are pivotally supported on fulcrums 120 on depending leg portions 121 projecting downwardly from gripping arm brackets 122 removably secured to the underside of cambering beam 13 and stiffening plate 20 by means of bolts extending through openings 123 in the beam and stiffening plate, as best shown in Fig. 19. The brackets 122, as shown in Figs. 1 and 2, are spaced apart in pairs to receive between them the gripping arms 125 having their fulcrums 126 in pedestal portions 124 on the brackets, the pedestals projecting upwardly from the beam underlying portions of the brackets at opposite side edges of the beam stiffening plate 20, as best shown in Fig. 6.

The gripping arms are bent inwardly at 127 to provide sill abutment faces 128 in the arm portions above the fulcrums 126, the gripping arm portions below the fulcrums extending downwardly for connection pivotally with link members 129 at their outer ends, as at 130. The link members are connected together at their inner ends and to the jaws 131 of cylinder pistons 132 by pins 133 to provide a floating joint between said arms 125 and respective pistons 132 by virtue of the swivelling connection between the assembly supporting-brackets 122 and the air cylinders B fulcrumed to them, whereby the links 129, gripping arms 125 and cylinders may adjust themselves to possible variations in the placement of the work on the machine and travel of the arms to insure contact of the sill-gripping abutments 128 on said arms and the work. The links 129 are normally inclined so that upon upward movement of the pistons 132, under pressure, the links will be placed in compression under thrust of the pistons 132 to force the depending portions of the arms 125 outwardly to cause rotation thereof upon their fulcrums 126 to move abutments 128 against the work. To properly gauge the space between the inner faces of the webs 72 to predetermined standard, to resist possible yielding movement or displacement of the sill members under pressure of gripping arm abutment thrusts, the outwardly extending portions 9 of brackets 19 may be extended outwardly beyond the edges of the beam flanges for engagement with the webs 72, or similar brackets may be provided for the same purpose that could be removably secured to the beam and shifted from one position on the beam 13 to another depending upon the length of the sill members operated upon. To support the sill member lower flanges 71 under pressure from the end hold-down clamping bars 114, blocks 134 are secured at spaced intervals on stiffening plate 20 and adjacent the edges of lower flanges 21 of beam 13 and of a height to insure positive engagement with the sill member flanges 71 throughout the cambering movements of beam 13, all as best shown in Figs. 6, 19 and 20.

To insure accuracy in the mounting of the sill members 69 lengthwise of the cambering beam 13, the beam at the shorn flange position is fitted at one end with gauge plates 140 removably secured to opposite sides of the web 18 and provided with outwardly projecting shim brackets 141 for supporting relatively high and low rollers 142 and 143 at the forward ends of the plates. Similar brackets 144 for supporting other like rollers 145 and 146 are provided at the rear ends of said plates, the lower rollers 143 and 146 at the respective front and rear ends of the plate being so disposed that the overall distance over such rollers does not exceed the distance between the abutment faces of the front and rear draft stops 91 and 92 on the sill members so that the sill members 69 will rest upon the cambering beam with the abutment faces of the draft stops on one sill member in precise alignment longitudinally with abutment faces of the draft stops on the companion sill member. To guide the sill members 69 during the operation of mounting them upon the beam, the plates 140 are further equipped with guide brackets 147 formed with sloping faces 148 positioned above and substantially tangent to rollers 142 at the forward ends of the plates and similar brackets 149, with sloping faces 150 above and substantially tangent to adjacent rollers 145, at the rear ends of the plates, so that the draft stops will first contact bracket faces 150 before engaging the respectively adjacent rollers. By this method of assembling, the alignment of the stops at one end of the sill members 69 will automatically insure alignment of similar stops at the opposite ends of said members.

For the sill clamping operation, pressure cylinders B, arranged in series, are supplied with air from supply lines 160 and 161 controlled by a three-way valve 162 of any approved make. The cylinders are operated simultaneously, and the air is supplied to one side of the pistons 132 or the other depending upon the direction of movement of the control handle 163 on the valve 162, as will be understood. The end clamping cylinders A are separately operated for safety and are fed by a separate supply line 164 controlled by three-way valves 165 and 166, respectively, all as shown in Figs. 7 and 8.

To facilitate the operation of mounting the work upon the machine, catwalks 170 are provided about the machine for the convenience and safety of the workmen—the walks being removably secured to permit more convenient transfer of the machine at times when operations thereon are to be performed at different locations in the shop. The platform is arranged in sections for convenient handling, the boards 171 of each section being mounted on supports 172 formed, preferably as shown in Figs. 15, 16 and 17, of pressed channel pieces having a web portion 173, and upper and lower flange portions 174 and 175, with abutment flange 176 for bearing engagement with the supporting webs 24 of base beams 11 of the machine. The boards 171 are bolted to the upper flanges 174 of the desired number of brackets 172 required for each section, four in the present embodiment, as shown in Fig. 13. To the web 24 are applied hinge eyes 177 of substantially U-shape with leg portions 178 and a connecting portion 179, as shown in Fig. 18. The eyes are secured to the beams preferably by welding the ends of the leg portions to the web 24 of the beams 11, as indicated in Fig. 13.

The platform supporting brackets 172 are formed at their inner ends with hook portions 180 designed to engage the hinge eyes 177 so that the recesses 181 on the hooks will receive the eye piece portions 179 when the brackets are in position with rear flanges 176 resting against the beam web 24. To permit attachment of the bracket hooks 180 to the hinge eyes, the brackets at the hook position are recessed at 182 inwardly of the plane of bearing face of flange 176 by an amount approximating the depth of hook socket 181 in order to prevent sagging of the brackets to insure uniform height of platforms from the floor at their edge portions. To detach from the hinge eyes, the platforms are tilted upwardly until the beveled portions 183 of recess 182 on the brackets engage the beam wall 24, at which time the portions 179 will have been freed of the hook recesses 182 then lifted upwardly to clear the hinge eyes.

The machine described has demonstrated its usefulness in the cambering and welding of center sill members for railway cars. It may be mounted upon trucks C and D, as shown in Fig. 9, when used with welding gantries in fixed locations, or upon the floor under its own weight without the necessity for tying down to insure stability when it is to be used with portable welding equipment.

Obviously, various modifications could be made in the machine to accommodate work of different character than that for which the present embodiment is adapted, and it is intended that the appended claims be construed to cover other forms of the machine within the scope of the invention.

What is claimed is:

1. A beam fabricating machine having a relatively rigid base portion and a work cambering beam, anchorage means yieldably connecting the ends of said beam to said base portion and adapted to compensate for variations in the length of said beam when cambered, a welding bar operatively superposed on said beam, pressure devices intermediate the beam ends for flexing said beam, and other pressure devices for clamping the work to the beam and bar for welding.

2. A beam fabricating machine having a relatively rigid base portion and a work cambering beam, means connecting the ends of said beam to said base portion, a welding bar operatively superposed on said beam, pressure devices carried by said base portion intermediate the beam ends for flexing the beam and said welding bar, and other pressure devices carried by said beam for clamping the work to said beam and bar.

3. A beam fabricating machine having a relatively rigid base portion and a work cambering beam, means connecting the ends of said beam to said base portion, a welding bar removably superposed on said beam, pressure devices intermediate the beam ends for flexing said beam and welding bar, and other pressure devices carried by said beam for cambering and clamping the work on said bar for welding.

4. A beam fabricating machine having a relatively rigid base portion and a work cambering beam, means pivotally connecting the ends of said beam to the base portion, a welding bar operatively secured to said beam, pressure wedge devices supported at spaced intervals along said base portion intermediate the beam ends for flexing said beam and bar and operable severally, complementary assembly portions on said beam for respectively engaging said wedges, and separate pressure devices carried by said beam and operable independently of said first pressure means for clamping the work to said beam and welding bar.

5. A beam fabricating machine having a relatively rigid base portion and a work cambering beam, means yieldably connecting the ends of said beam to the base portion, a welding bar operatively secured to said beam, manually operable pressure devices intermediate the beam ends for flexing said beam and welding bar, hold-down clamping means for cambering the work to said beam and welding bar, work side clamping means, and air cylinders supported by said beam for operating said clamping means.

6. A beam fabricating machine having a relatively rigid base portion and a work cambering beam, a welding bar operatively secured to said beam, means pivotally connecting the ends of said beam to the base portion, manually operable pressure devices intermediate the beam ends for flexing said beam and welding bar, hold-down clamping means for cambering the work and welding bar, work side clamping means, relatively fixed power cylinders for operating the hold-down clamping means, and pivotally hung power cylinders for operating said work side clamping means, said power cylinders being all of them supported by said beam.

7. A beam fabricating machine having a relatively rigid base portion and a work cambering beam, means pivotally connecting the ends of said beam to the base portion, a welding bar operatively secured to said beam, manually operable pressure devices intermediate the beam ends for flexing said beam and welding bar, hold-down clamping means for cambering the work and welding bar, work side clamping means, relatively fixed power cylinders for operating the hold-down clamping means, and pivotally hung power cylinders for operating said work side clamping means, said power cylinders being all of them removably supported by said beam.

8. A beam fabricating machine having a rigid base portion and a work cambering beam, a welding bar operatively secured to said beam, means pivotally connecting the ends of said beam to the base portion, and manually operable pressure devices intermediate the beam ends for flexing said beam and welding bar, said devices comprising each a pair of opposing wedge nuts, an actuating shaft common to said nuts, and upper and lower sloping faces engaging respectively the upper and lower sides of said nuts, said nuts being adapted upon rotation of the actuating shaft in one direction to approach each other to flex said beam upwardly into respect to said rigid base portion of the machine and upon rotation of said shaft in the reverse direction to propel said nuts away from each other to restore said beam to normal position with respect to said base portion.

9. In a sill fabricating machine having a relatively rigid base portion and a cambering beam pivotally secured at its ends to said base portion, a welding bar operatively superposed on said beam, pressure devices intermediate the beam ends for flexing said beam and welding bar, gauging means on said beam for guiding the work to an operative position on said beam and welding bar, and work clamping means for holding the work to said bar during the welding operation.

10. In a sill fabricating machine having a relatively rigid base portion and a cambering beam pivotally secured at its ends to said base portion, a welding bar operatively superposed on said beam, pressure devices intermediate the beam ends for flexing said beam and welding bar, and gauging means on the beam for guiding the work to an operative position on said beam and welding bar, and comprising a pair of base plates removably secured in registered relation upon opposite sides of the beam, fore and aft pairs of work engaging rollers at the front and rear end portions of the respective plates, and guiding brackets respectively adjacent said rollers and formed with inclined work deflecting faces disposed in approximate tangential relation with respectively adjacent rollers.

11. In a beam fabricating machine having a relatively rigid base portion and a work cambering beam, means connecting the ends of said beam to the base portions, a welding bar operatively secured to said beam, pressure devices manually operable between the beam ends for flexing said beam and welding bar, hold-down clamping means for cambering the work and work side clamping means for holding the work in position for welding on said bar, air cylinders supported by said beam for operating said clamping means, said hold-down clamping air cylinders being operable separately and independently of the work side clamping cylinders, and means in the air supply line for controlling said cylinders.

WILLIAM M. BERNHARDT.
ARTHUR H. HARTWIG.

CERTIFICATE OF CORRECTION.

Patent No. 2,269,754.　　　　　　　　　　　　　　　January 13, 1942.

WILLIAM M. BERNHARDT, ET AL.

It is hereby certified that error appears in the printed specification of the above numbered patent requiring correction as follows: Page 5, second column, line 52, claim 8, for "into" read --with--; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.